United States Patent [19]
Murphy

[11] 3,915,489
[45] Oct. 28, 1975

[54] ELEVATOR PLUG

[76] Inventor: Noast Lee Murphy, Box 4426, Midland, Tex. 79701

[22] Filed: Oct. 9, 1974

[21] Appl. No.: 513,505

[52] U.S. Cl. .................... 294/96; 403/369; 403/371
[51] Int. Cl.² .......................................... F16D 1/00
[58] Field of Search ............. 294/96, 86.25, 94, 95; 279/2; 85/87; 403/369, 370, 371

[56] References Cited
UNITED STATES PATENTS

| | | | |
|---|---|---|---|
| 777,399 | 12/1904 | Church | 85/87 |
| 2,624,610 | 1/1953 | Murphy | 294/96 |
| 2,878,709 | 3/1959 | Horvath | 85/87 |
| 3,278,220 | 10/1966 | Wilson | 294/86.25 |

*Primary Examiner*—Andrew V. Kundrat
*Attorney, Agent, or Firm*—Clarence A. O'Brien; Harvey B. Jacobson

[57] ABSTRACT

An elevator plug having an upright stem provided at an upper end with screw threads for attaching a yoke to the stem, and at the lower end with a frusto-conical cam member for engaging an expansible and contractable body provided with an axial bore in which the stem is slidably arranged. The body is formed by a plurality of sections around which is arranged a sleeve for preventing excessive spreading of the sections, while an enlarged portion is provided on the stem adjacent its uppermost end for forming an abutment for the yoke. A washer may be placed between the enlarged portion and the yoke for decreasing wear on the abutment-forming shoulder of the enlarged portion.

4 Claims, 4 Drawing Figures

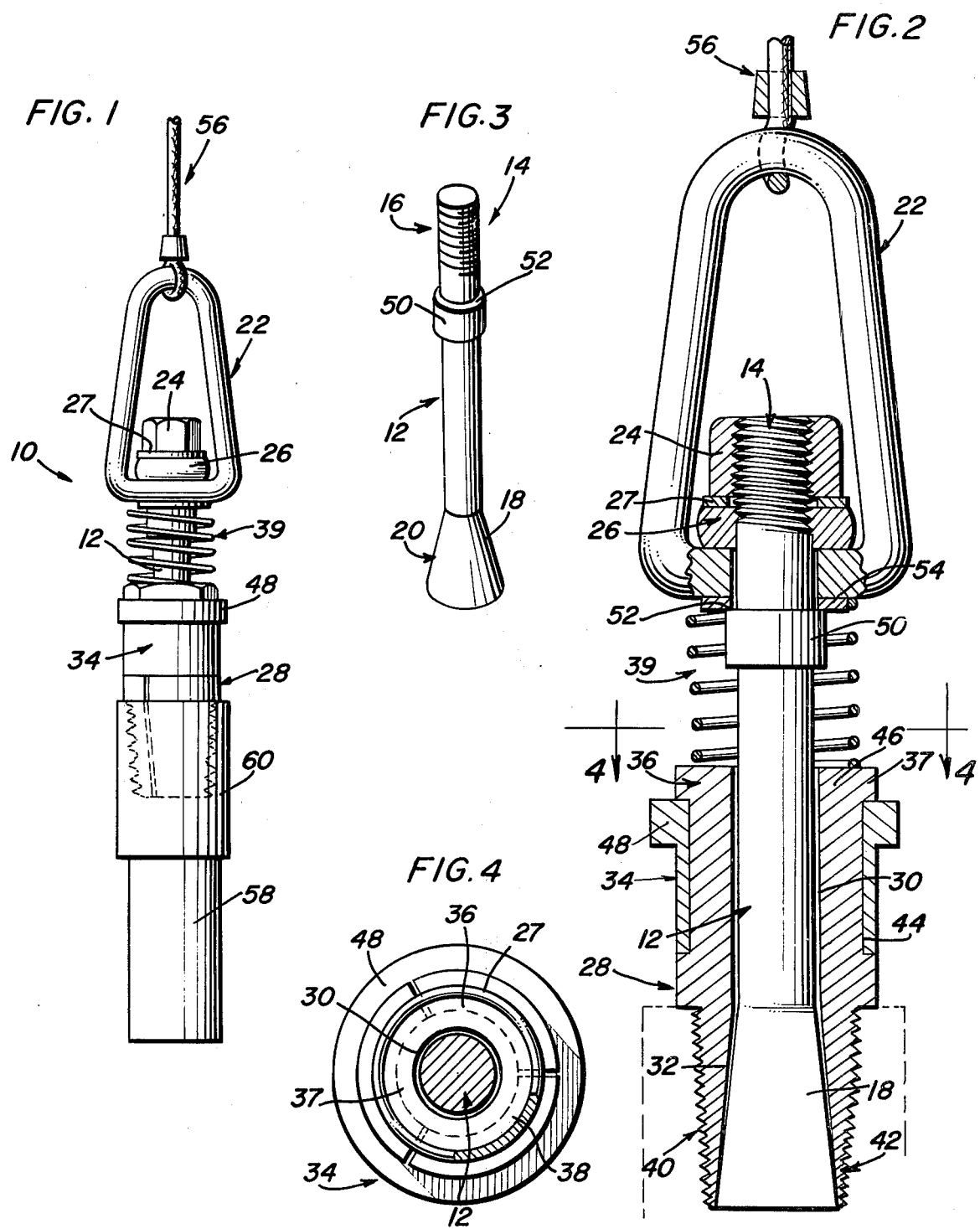

ELEVATOR PLUG

BACKGROUND OF THE INVENTION

1. Field of the Invention

This invention relates generally to elevator plugs used in raising and lowering drill rods during drilling operations, and particularly to new and useful improvements and structural refinements in such elevator plugs.

2. Description of the Prior Art

During earth drilling operations, and the like, it frequently becomes necessary to withdraw sections of drill rod or pipe from the bore of a well being drilled. In order to facilitate this withdrawal operation, a device which is generally referred to as an "elevator plug" is employed to attach the drill rod or pipe to a lifting cable. Examples of such elevator plugs are shown in U.S. Pat. No. 2,594,429, issued Apr. 29, 1952 to E. J. Handley, U.S. Pat. No. 2,622,916, issued Dec. 23, 1952 to L. Libin et al., and U.S. Pat. No. 2,624,610, issued Jan. 6, 1953 to C. R. Murphy.

U.S. Pat. No. 1,460,099, issued June 26, 1923 to E. C. Immel, discloses structure believed to be pertinent to the present invention.

SUMMARY OF THE INVENTION

It is an object of the present invention to provide an elevator plug having simple, yet rugged and reliable, construction when compared with prior art elevator plugs.

It is another object of the present invention to provide an improved elevator plug that has fewer parts and less wear than similar prior art elevator plugs, while simultaneously retaining convenient and expeditious ability to pull drill pipes without damaging the screw thread of the tool joint.

These and other objects are achieved according to the present invention by providing an elevator plug having: an upright stem provided with screw threads at an upper end of the stem and a frusto-conical cam member at a lower end of stem; a suspension yoke rotatably mounted on the upper end of the stem; a keeper nut engaging the screw threads and arranged for retaining a thrust bearing on the stem between the yoke and the nut; a substantially tubular expansible and contractable body provided with an axial bore having the stem slidably arranged therein, the bore including a frusto-conical lower end portion operatively engaged by the cam member; and a sleeve arranged around the body for cooperating with same and prevent excessive spreading of the expansible and contractable body. Advantageously, the body includes a plurality of longitudinal sections arranged cooperating to form the substantially tubular body. These sections are provided with a diametrically reduced portion arranged extending substantially from the lower end portion of the body, where screw threads are preferably provided for facilitating attachment of the plug to a drill rod, to an upper end of the body, with this reduced portion forming a seat for the sleeve.

The stem is also advantageously provided according to the present invention with a diametrically enlarged portion adjacent the screw threads at the upper end of the stem. The enlarged portion forms a shoulder at the point of transition thereof relative to the stem arranged closest to the stem screw threads, and the shoulder is arranged forming an abutment for the yoke. According to advantageous feature of the present invention, a shoulder washer, and the like, is arranged between the shoulder of the enlarged portion and the yoke for protecting the shoulder of the enlarged portion from wear.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a fragmentary, side elevational view showing an elevator plug according to present invention connected between and a cable and drill rod.

FIG. 2 is a fragmentary, vertical longitudinal sectional view showing the elevator plug of FIG. 1, but drawn to a larger scale than FIG. 1.

FIG. 3 is a perspective view showing a stem for an elevator plug according to the present invention.

FIG. 4 is a sectional view taken generally along the line 4—4 of FIG. 2.

DESCRIPTION OF THE PREFERRED EMBODIMENT

Referring now more particularly to the drawings, an elevator plug 10 according to the present invention has a stem 12 normally arranged in an upright orientation, as illustrated, and provided with conventional screw threads 14 and an upper end 16 of stem 12. A frusto-conical cam member 18 is arranged at the lower end 20 of stem 12. The construction of stem 12 can perhaps best be seen from FIGS. 2 and 3 of the drawings.

A suspension yoke 22 is rotatably mounted on the upper end 16 of stem 12 as by a keeper nut 24 threadingly engaging screw threads 14. A conventional thrust bearing 26 is retained on the upper end 16 of stem 12 by virtue of its arrangement between yoke 22 and nut 24. A bearing washer 27 is advantageously arranged between bearing 26 and nut 24. While bearing 26 may be of any suitable kind available on the market, a "Timken" model T-113 has been found satisfactory.

A substantially tubular expansible and contractable body 28 is provided with an axial bore 30 having stem 12 slidably arranged therein. Bore 30 includes a frusto-conical lower end portion 32 which is operatively engaged by cam member 18 that forms the lower end 20 of stem 12. A sleeve 34 is disposed around body 28 for cooperating therewith and prevent excessive spreading of the body in a manner to be described in greater detail below.

Body 28 is advantageously constructed from a plurality of longitudinal sections 36, 37, and 38 arranged cooperating to form the substantially tubular body. As will be readily appreciated from FIG. 2 of the drawings, when stem 12 slides upwardly in body 28, the sections 36, 37, and 38 of the body will be expanded by action of cam member 18 on the converging walls of end portion 32 of bore 30. Further, it will be appreciated that the conventional compression spring 39 arranged between yoke 22 and body 28 will bias body 28 downwardly as seen in FIGS. 1 and 2 so that stem 12 will be effectively raised relative to body 28 and force body 28 into its expanded position.

The lower end portion 40 of body 28 has an outer surface provided with screw threads 42 arranged facilitating attachment of plug 10 through a drill rod. Further, sections 36, 37, and 38 cooperate to form a diametrically reduced portion 44 of a generally cylindrical nature and ranged extending substantially from lower end portion 40 of the body 28 to an upper end 46 of same. This reduced portion 44 forms a seat for sleeve 34, with the latter being arranged in the reduced portion. An annular lip 48 is advantageously provided on, for example, the end of sleeve 34 that will be arranged uppermost on plug 10 for facilitating manipulation of sleeve 34 relative to body 28 when the latter is in its contracted position (not shown).

Stem 12 is advantageously provided with a diametrically enlarged portion 50 arranged adjacent screw threads 14 and the upper end 16 of stem 12. This enlarged portion 50 forms a shoulder 52 at the point of transition of the enlarged portion relative to the stem arranged closest to screw threads 14. Shoulder 52 is arranged forming an abutment for yoke 22, and advantageously there is a shoulder washer 54 arranged between shoulder 52 and yoke 22 for protecting shoulder 52 from wear.

As can be seen from FIG. 1 of the drawings, yoke 22 of plug 10 is connected to a conventional cable 56 in the usual manner, and by screw threads 42 to a drill rod 58 by means of a conventional joint or box 60 forming part of the rod 58 which is to be elevated or lowered.

Body 28 of plug 10 is sufficiently heavy so that when the lower end portion 40 of body 28 is lowered into a box 60 and the line formed by cable 56 is pulled upwardly the body 28 will tend to remain at rest, the cam member 18 of stem 12 will expand the sections 36, 37, and 38 of body 28 into a frictional engagement with joint or box 60, and, consequently, as upward pulling force is exerted on cable 56, the entire plug 10 together with the drill rod 58 will be drawn upwardly. In this regard, the gripping action between plug 10 and joint or box 60 of rod 58 is substantially enhanced by the provision of screw threads 42 on the lower end portion 40 of body 28. These screw threads engage the screw threads conventionally provided on the usual joints, and provide a positive connection between the plug and drill rod without mutilating the tool joint.

When the load has been removed from body 28, the bias of spring 39 may be overcome in order to contract the sections forming body 28 in order to release stem 12 from the body. In this manner, various adjustments and manipulations may be made with the stem 12, body 28, and sleeve 34 as desired and found necessary.

While it is to be understood that dimensions of the various elements of a plug according to the present invention may vary as desired and in view of intended use of the plug, in order that those skilled in the particular art may be readily enabled to construct the present invention, it is noted that the band-like enlarged portion 50 has been found satisfactory when made about, for example, three quarters of an inch wide with a shoulder of about one quarter of an inch in depth. The recess formed by reduced portion 44, and accordingly the length of sleeve 34, has been found satisfactory when made about, for example, two and one quarter inches long. The sleeve 34 is effective to keep the threads 42 of the various sections 36, 37, and 38 forming body 28 in alignment with each other to facilitate threading of body 28 into the joint or box 60.

As will be appreciated from the above description and from the drawings, an elevator plug according to present invention provides a simple, yet rugged and reliable, device for facilitating withdrawal and replacement of drill rod, and the like, from a well or other bore.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In an elevator plug comprising, in combination:
   a. a longitudinal stem provided with screw threads at a one end thereof and a frusto-conical cam member at another end thereof spaced from the one end;
   b. a suspension yoke rotatably mounted on the one end of the stem;
   c. the keeper nut engaging the screw threads and arranged for retaining a thrust member on the stem between the yoke and the nut;
   d. a substantially tubular expansible and contractable body provided with an axial bore having the stem slidably arranged therein, the bore including a frusto-conical end portion arranged adjacent the another end of the stem and operatively engaged by the cam member of the stem; and
   e. limiting means cooperating with the body for preventing excessive spreading of same;
   the improvement wherein, the limiting means is a sleeve arranged around the body, and the stem is provided with a diametrically enlarged portion adjacent the screw threads at the one end of the stem, the enlarged portion forming a shoulder at the point of transition thereof relative to the stem arranged closest to the stem screw threads, and the shoulder arranged forming a planar abutment for a planar surface of the yoke, the body including a plurality of longitudinal sections cooperating to form the substantially tubular body, and further including an end portion arranged adjacent the cam of the stem and having an outer surface provided with screw threads facilitating attachment of the plug to a drill rod, and the improvement further including a diametrically reduced portion of the sections forming the body, the reduced portion arranged extending substantially from an end portion of the body adjacent the cam member of the stem to an end of the body closest to the enlarged portion of the stem, the reduced portion forming a seat for the sleeve, with the latter being arranged in the reduced portion for alone keeping the screw threads of the sections forming the body in alignment with one another, and an annular lip provided on the sleeve at an end of the sleeve arranged adjacent the end portion of the body closest to the enlarged portion of the stem for facilitating manipulation of the sleeve.

2. A structure defined in claim 1, further including a shoulder washer arranged between the shoulder of the enlarged portion and the yoke for protecting the shoulder of the enlarged portion from wear.

3. An elevator plug, comprising, in combination:
   a. a longitudinal stem provided with screw threads at a one end thereof and a frusto-conical cam member at another end thereof spaced from the one end, the stem further provided with a diametrically enlarged portion adjacent the screw threads thereof, the enlarged portion forming a shoulder at the point of transition thereof relative to the stem arranged closest to the stem screw threads;

b. a suspension yoke rotatably mounted on the one end of the stem, with the shoulder formed by the enlarged portion of the stem forming a planar abutment for a planar surface of the yoke;

c. a keeper nut engaging the screw threads of the stem and arranged for retaining a thrust bearing on the stem between the yoke and the nut, the keeper nut also retaining the yoke on the stem;

d. a substantially tubular expansible and contractable body provided with an axial bore having the stem slidably arranged therein, the bore including a frusto-conical end portion arranged adjacent the another end of the stem and operatively engaged by the cam member of the stem; and e. limiting means including a sleeve arranged around the body for cooperating with the body and preventing excessive expansion of same, the body further including a plurality of longitudinal sections cooperating to form the substantially tubular body, and still further including an end portion arranged adjacent the frusto-conical end portion of the bore provided in the body and having an outer surface provided with screw threads for facilitating attachment of the plug to a drill rod, the sections of the body provided with a diametrically reduced portion arranged extending substantially from said end portion of the body to another end portion of the body closest to the enlarged portion of the stem, the reduced portion forming a seat for the sleeve, with the latter being arranged in the reduced portion for alone maintaining alignment of the screw threads provided on the plurality of sections forming the body, and an annular lip provided on the sleeve at an end of the sleeve arranged adjacent the end portion of the body closest to the enlarged portion of the stem for facilitating manipulation of the sleeve.

4. A structure defined in claim 3, further including a shoulder washer arranged between the shoulder of the enlarged portion and the yoke for protecting the shoulder of the enlarged portion from wear.

* * * * *